Patented Aug. 6, 1940

2,210,763

UNITED STATES PATENT OFFICE 2,210,763

CARBON BLACK COMPOSITIONS, ETC.

Robert J. King, New Canaan, and William Mitchell, Jr., Stamford, Conn., assignors to King & Lang, Inc., Stamford, Conn., a corporation of Connecticut No Drawing. Application October 21, 1937, Serial No. 170,194

4 Claims. (Cl. 134—58)

This invention relates to improvements in carbon black products.

Carbon black pigments are extensively used, particularly in rubber compounding, in printer's inks, and in paints, enamels and lacquers, etc. Carbon black pigments are produced by different processes and have somewhat different properties. They are known under such common names as lamp black, gas black, channel black, impingement black, thermal decomposition carbons, etc. The present invention relates to the treatment of the impingement blacks, including the high color blacks which are extensively used for paints, varnishes, lacquers, and inks and the channel blacks which are extensively used for rubber compounding, particularly in tread stock compositions.

Such carbon black pigments are made up of exceedingly fine particles, and an exceedingly large number of these fine particles is required in the manufacture of commercial compositions containing them. The difficulty in obtaining a sufficiently uniform distribution and dispersion of the carbon black particles in the compositions in which they are used as pigments is well known in the art and various proposals have heretofore been made to overcome such difficulty.

The improved treated impingement carbon blacks of the present invention have improved properties which facilitate the desired distribution thereof through the compositions in which they are to be used.

According to the present invention impingement carbon blacks are treated with a small amount of an acid which imparts thereto improved properties and facilitates their dispersion or distribution or incorporation in rubber and other compositions.

The acid which we have found particularly advantageous in the treatment of carbon black pigments is hydrochloric acid, in amount representing only a small fraction of 1% of the carbon black treated, for example, 0.05% or 0.1%.

Other acids can be used for treating the carbon blacks, including both mineral acids, and aliphatic and aromatic organic acids, which are soluble in water, and which can be effectively admixed with the carbon black to be treated. In general, the amounts of other acids will vary somewhat but for best results only a fraction of a percent, and usually a small fraction of a percent, seems sufficient. Various acids, in amount corresponding to about 0.1% hydrochloric acid (HCl) are suitable, that is, quantities equivalent molecularly, or approximately so, to 0.1% hydrochloric acid on the black. With organic acids, somewhat larger amounts may be useful. In general the amount of acid required will be less than 1%, and for many if not most acids the best results appear to be obtained with less than 0.5%; and amounts as small as 0.01% have in some cases been found sufficient. Somewhat more than 1% of acid can be used in some cases, particularly in the case of some of the organic acids.

Among the acids which can thus be used are included hydrochloric acid, sulphuric acid, sulphur dioxide, phosphoric acid, arsenic acid, hydrobromic acid, hydrofluoric acid, acetic acid, formic acid, lactic acid, glycolic acid, butyric acid, benzoic acid, maleic acid, propionic acid, salicylic acid, acetyl salicylic acid, monochloracetic acid, dichloracetic acid, trichloracetic acid, and phthalic acid.

The acids can in general be used in aqueous solution or in some cases in solution in one of the lower alcohols. When alcohol solutions are used they should in general be freshly prepared to avoid esterification of the alcohol with the acid before use. An aqueous solution of the acid can be sprayed onto the black and the entire mass of black then thoroughly mixed; or the acid can be added in some cases in gaseous form; or a master batch can be made containing a larger amount of acid than required in the final product and this batch then admixed with a mass of untreated black, with thorough admixture. The admixture can advantageously take place at ordinary temperatures and pressures. Where the black is formed into pellets, the acid can be added to the water used in forming the pellets.

In adding the acids and admixing them with the blacks care should be taken to obtain thorough admixture. If, subsequent to the addition of acid, the black is subjected to heat treatment, the time and temperature of such heat treatment should be so controlled or adjusted that the acid is not destroyed or driven out or the treated black so changed as to destroy or render ineffective the acid treatment. We have found that the spraying of an acid onto the black followed by thorough admixture, and by permitting the treated black to stand, results in apparently uniform and thorough dissemination of the acid throughout the black, possibly due to migration or vapor tension effects.

The treated blacks contain an exceedingly small amount of the treating acid, such that it may be difficult or impossible to identify the presence of the acid by ordinary analytical tests.

Nevertheless the treated blacks have materially improved properties, particularly from the standpoint of their dispersion in rubber or in paint, varnish, lacquer, or ink vehicles, etc.

The acid which we have found particularly advantageous, as above pointed out, is hydrochloric acid, which can readily be used in aqueous solution of suitable strength, for example, a 10% solution, sprayed onto the carbon black with thorough admixture. Good results have also been obtained with the use of alcohol solutions of the acid, particularly when freshly prepared.

One result of the acid treatment of the carbon blacks that have been investigated is a material lowering of the pH value, when treated according to the method described by Wiegand, Industrial and Engineering Chemistry, volume 29, pages 953–6. As pointed out by Wiegand, the different commercial carbon black pigments differ greatly in their pH value when tested in the manner described, that is, by making a sludge of the carbon black, by boiling with water, decanting off the supernatant water and testing the sludge. In the case of the untreated blacks with a low pH value the treatment with acid according to the present invention makes the pH value still lower; while in the case of untreated blacks with a high pH value, the treatment according to the present invention reduces the pH figure in general to around 3 or less. For example, in the case of carbon blacks treated with .1% hydrochloric acid in aqueous solution the pH value of impingement blacks of low pH value in an untreated state were further materially reduced; while the pH of certain impingement blacks of higher pH value were reduced to a great extent, for example, to less than 3.

As illustrating this reduction in pH value by treating the carbon blacks with .1% of hydrochloric acid in aqueous solution, the following instances are given:

In the case of impingement, ink and paint blacks the pH value of the black was reduced by the treatment, in one case from 3.44 to 2.30, in another case from 4.30 to 2.60, in another case from 4.70 to 3.10 and in another case from 4.10 to 3.15. In the case of a fast curing impingement rubber black the pH value was reduced by the treatment, in one case from 5.10 to 2.70. The pH value of the treated black may be somewhat different when freshly prepared from its value after standing for a while, due perhaps to a further dissemination or distribution of the acid throughout the mass.

The improved properties of the treated blacks of the present invention make them particularly advantageous for use in compositions where effective distribution or incorporation of the carbon black is important. We have found in numerous instances that a more liquid product or composition was obtained with the treated black than with the same black untreated, when these respective blacks were incorporated in rubber, in water, in petroleum oil, in linseed oil, and in nitrocellulose lacquer. In general, we have found in numerous instances that the treated blacks gave products with improved properties which looked blacker. In general the acid used in treating the black should not be of such a nature or in such an amount as to be incompatible with the particular composition or its ingredients with which it is incorporated.

The new blacks therefore give improved compositions in which the treated blacks are incorporated, including ink compositions, rubber and other plastic compositions, and coating compositions such as paints, lacquers, and enamels.

A valuable embodiment and application of the present invention involves the utilization of the new treated blacks in rubber compounding, and particularly in making tread stock compositions having a high carbon black content.

In the manufacture of tire treads for automobiles it is customary to use tread stock formulas containing a high percentage of carbon black, amounting to around 45 or 50% by weight of the rubber in the composition. The difficulty in obtaining a proper distribution or incorporation of the carbon black in the rubber is well recognized, as well as the difficulty in obtaining consistently uniform results. The treated blacks of the present invention have improved properties which make them particularly valuable for use in such tread stock compositions. The treatment of the black facilitates the dispersion or incorporation of the black in the rubber and the plasticizing of the rubber. The treated blacks can be readily incorporated with hard, unmilled rubber and to better advantage with rubber which has been somewhat softened, but it is not necessary to maintain the mix as stiff as possible. The treated blacks mix in more quickly and in a shorter time and with a lowering of the mill temperature as compared with the untreated blacks. The stearic acid used in tread stock compositions may be milled in with the black but if it is desired to add it later it mills in more quickly. The other powdered compounding ingredients mixed with the rubber composition can also be mixed more quickly when the new treated blacks are used. Much less time is also required to get good dispersion or incorporation and the resulting stocks remill easily.

Tests on the vulcanized tread stock compositions show a very marked increase in the resistance to abrasion and in flexing properties, as well as a notable increase in the modulus.

The following composition illustrates a tire tread formula on which a series of cures were carried out:

| | Parts |
|---|---|
| Rubber | 100 |
| Carbon black | 50 |
| Pine tar | 1 to 3 |
| Stearic acid | 4½ |
| Sulphur | 3 |
| Captax (mercaptobenzothiazol) | 1 |
| Antioxidant | 1 |
| Zinc oxide | 5 |

In the above composition both untreated carbon black and treated carbon black were used in different batches. In the batches containing the untreated black 3 parts of pine tar were used, and in the batches containing treated black 1 part of pine tar was used. Cures were made at 274° F. and with a series of time intervals, namely, ten, fifteen, thirty, forty-five, sixty, ninety and one hundred and twenty minutes. A study of the results showed that the sixty-minute cures reflect in a satisfactory way the comparisons between the various mixtures.

Comparing the sixty minute cures thus obtained with the formulas containing untreated and treated black it was found that the treated blacks showed a marked increase in the 300% modulus and a significant increase in the tensile strength at break.

With products made with the above formula, and comparing the representative sixty minute cures, it was found in one case with 50% of carbon black on the rubber the tensile was 4430 and the 300% modulus was 1600 with the untreated carbon black products; and showed an increase with the treated black of from 10 to 15% in the modulus with the tensiles remaining about the same or slightly higher.

Similar improved results were obtained using 45% and 60% carbon black on the rubber. In the case of a formula made with 45% carbon black on the rubber and which showed a tensile of 4560 and a 300% modulus of 1480 with the untreated black, an increase of around 10% was obtained in the modulus with the treated black, while the tensile averaged about the same or slightly higher. An increase in the 300% modulus of around 15% was obtained on stocks containing 60% carbon black.

The improved properties of the rubber composition in which the treated blacks were incorporated were indicated by visual appearance and were further indicated by consistently better abrasion and flexing results, as compared with compositions containing untreated blacks. The marked increase in modulus also strikingly confirms the improved results obtained with the treated blacks.

The results obtained with the use of carbon black treated with hydrochloride acid indicates that for best results only a very small percentage of 1% of hydrochloric acid on the black is required. The blacks treated with hydrochloric acid may show some retarding of the cure, particularly if larger amounts of hydrochloric acid are used; but with blacks treated with around 0.05% HCl or 0.1% HCl, and with stocks where a proper alkalinity is obtained, by the presence of zinc oxide, we have observed no objectionable retarding of the cure. With tread stock compositions containing 1% pine tar and about 50% of a treated black, treated with 0.1% hydrochloric acid, in comparison with a similar tread stock made with untreated black and with 3% pine tar, and on subjecting the resulting products to severe aging tests, the typical tread stock formulas showed comparable aging results in the two cases.

It is one advantage of the treated carbon black pigments of the present invention, when used in tread stock compositions, that an increased amount of the black can be used and satisfactory dispersion or incorporation or admixture nevertheless obtained. Compositions containing from 45 up to 70% of the treated black have been satisfactorily produced. In its broader aspects, however, the percentage of the treated black used in the new rubber compositions is not limited to these proportions but lower amounts can be used, particularly for low carbon formulas, and with improved results in the compounding and dispersion of the carbon blacks in the rubber.

The carbon blacks commonly used in rubber compounding for tread stocks are so-called channel blacks, although other impingement blacks are extensively used. The carbon black used in the above examples was channel black.

As previously pointed out, we consider hydrochloric acid particularly advantageous for treating carbon blacks, including carbon blacks for rubber compounding; and the improved results obtained are indicated by the above examples and particularly by the materially increased modulus obtained.

In its broader aspects, however, the invention includes the treatment of the blacks with other acids with which similar but somewhat varying results are obtained. In general, as above pointed out, the other acids can be used in quantities equivalent molecularly to 0.1% hydrochloric acid on the black and about 0.05% on the rubber, in the case of tread stock compositions containing about 50% carbon black based on the rubber. With the organic acids a somewhat larger amount of the acid may be desirable, including amounts several times that equivalent molecularly to the hydrochloric acid, but in any event the percentage of the acid on the black is small, as previously indicated.

When the new treated blacks are used for other purposes than rubber compounding, such as in printers' inks, or in coating compositions such as paints, lacquers and enamels, the use of the treated blacks gives improved results in blackness, in dispersion or incorporation of the black, and in some cases in the amount of the black which can be incorporated in the vehicle or composition in which the black pigment is used.

The new rubber compositions, containing the improved carbon black, are not claimed herein, but are claimed in a divisional application.

We claim:

1. An acid treated, impingement carbon black carrying a water soluble acid, the amount of acid being less than 1% based on the black, said carbon black having improved properties as compared with the untreated carbon black.

2. An acid treated, impingement carbon black carrying a small amount of a water soluble acid, the untreated carbon black having a pH value materially greater than 3 and the acid treated carbon black having a pH value less than about 3.

3. An acid treated, impingement carbon black carrying a small amount of a water soluble acid, said pigment having a pH value less than 4 and less than that of the untreated carbon black.

4. An acid treated, impingement carbon black carrying a fraction of 1% of hydrochloric acid.

ROBERT J. KING.
WILLIAM MITCHELL, Jr.